(12) United States Patent
Bates et al.

(10) Patent No.: US 7,047,487 B1
(45) Date of Patent: May 16, 2006

(54) METHODS FOR FORMATTING ELECTRONIC DOCUMENTS

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 479 days.

(21) Appl. No.: 09/569,293

(22) Filed: May 11, 2000

(51) Int. Cl.
*G06F 17/24* (2006.01)
*G06F 17/18* (2006.01)

(52) U.S. Cl. .................. 715/515; 715/501.1; 715/511; 715/512; 715/513

(58) Field of Classification Search ............. 715/501.1, 715/513, 512, 511, 910, 901, 515
See application file for complete search history.

(56) References Cited

U.S. PATENT DOCUMENTS

| | | | | |
|---|---|---|---|---|
| 5,745,910 A | * | 4/1998 | Piersol et al. ............... | 715/515 |
| 6,011,537 A | * | 1/2000 | Slotznick .................... | 715/733 |
| 6,031,989 A | | 2/2000 | Cordell ....................... | 395/701 |
| 6,185,588 B1 | * | 2/2001 | Olson-Williams et al. .. | 715/515 |
| 6,256,028 B1 | * | 7/2001 | Sanford et al. ............. | 345/841 |
| 6,859,909 B1 | * | 2/2005 | Lerner et al. ............... | 715/512 |
| 6,978,418 B1 | * | 12/2005 | Bain et al. ............... | 715/501.1 |

OTHER PUBLICATIONS

Holmboe et al., the z files, 2004, GreyTower Technologies, <http://www.greytower.co.uk/archive/articles/layers.html>.*
World-Wide-Web Consortium, Visual Formatting Model, 1998, W3.org, <http://www.w3.org/TR/REC-CSS2/visuren.html>.*
Musciano et al., "HTML: The Definitive Guide", 3$^{rd}$ Edition, pp. 34-35 and 181-192.
Zeichnick, "Third Voice: Extending the Interpersonal Communications Potential of the World Wide Web", http://www.thirdvoice.com/about/WhitePaperPage1.html, © 1999 Third Voice, Inc., pp. 1-8.

* cited by examiner

*Primary Examiner*—Stephen Hong
*Assistant Examiner*—Joshua D Campbell
(74) *Attorney, Agent, or Firm*—Patterson & Sheridan, LLP (57) ABSTRACT

The present invention provides a method and article of manufacture for formatting electronic documents. In general, an electronic document contains an <activebackground> tag which, when parsed by a browser allows a first electronic document to format, or overlay, a second electronic document with additional or replacement content. Although overlaid by the first electronic document, portions of the second electronic document remain visible and accessible to the user unless explicitly overridden by the first electronic document. In particular, hyperlinks provided by the second electronic document can remain active.

29 Claims, 8 Drawing Sheets

METHODS FOR FORMATTING ELECTRONIC DOCUMENTS

BACKGROUND OF THE INVENTION

1. Field of the Invention

The present invention relates to data processing. More specifically, the invention is generally related to methods for formatting electronic documents.

2. Background of the Related Art

In recent years, the popularity of the Internet has grown dramatically. One reason for such growth has been the widespread adoption of HTML (HyperText Markup Language), which is a language for describing document appearance, document layout and hyperlink specifications. HTML defines the syntax that describe the structure and the content of a document including text, images, and other supported media. Using HTML, a Web page can be created which contain, bitmap images, graphic images, text of various styles and sizes, and other formatting attributes and contents. HTML also provides connections among documents and other Internet resources through hyperlinks such as hypertext links and hypermedia links. Each hyperlink is associated with a Uniform Resource Locator (URL) of a destination HTML document, which is loaded and displayed when the link is selected by the user. Hyperlinks permit a viewer of the Web page to easily jump to another point within the page or to a completely different Web page, even one located on a different server. Using hypertext links and hypermedia links, users can connect to words, pictures, sounds and any other data files which can be stored on a computer.

An HTML document is located at an address represented by a URL, and may reside on a user's own computer, or on another computer networked with the user's computer. In particular, the HTML document may reside on a networked computer (called a host) with an Internet address. A logical grouping of HTML documents on a given host is known as a website and all websites taken together constitute the World Wide Web (WWW). Once an HTML file is made available on the World Wide Web via a server, any client connected to the World Wide Web can access the page using a software interface known as a browser. Access is typically accomplished by typing the URL in the appropriate browser field (or retrieving the address from a file, such as a bookmark file). After the URL has been entered, the browser requests the server to send the HTML file.

To display the HTML file, the browser relies on HTML commands embedded in the HTML file. These commands are referred to as "tags". The tags indicate features or elements of a page and cause the browser to perform various functions, such as a particular type of formatting. HTML tags can be identified in HTML files by their syntax. That is, the tags are surrounded by left angle brackets (initiating a tag function) and right angle brackets (turning the tag function off). The first word in a tag is its formal name, which is typically descriptive of its function. Any additional words in a tag are special attributes, sometimes with an associated value after an equal sign (=), which further define or modify the tag's actions. For example, a tag and attribute combination may define background color, background audio, inline images, a hyperlink, the beginning of a new paragraph and the like.

Despite the increasing flexibility offered by current versions of HTML, a programmer's ability to create web pages is often limited. As a result, considerable effort is expended by Web designers when authoring visually appealing and useful Web pages. For example, it is often desirable to rely on existing HTML pages in creating new electronic documents. In an attempt to provide greater programming flexibility, HTML offers formatting tools such as "frames." Frames are formatting feature allowing a browser window to be divided into multiple display areas, each containing a different document. A frame may contain any valid content that a browser is capable of displaying, including multimedia. If a frame's contents include a hypertext link the user selects, the new document's contents may replace that same frame, another frame's content, or the entire browser window. Frames are defined in a special HTML document in which the <body> tag is replaced with one or more <frameset> tags that tell the browser how to divide its main window into discrete frames. Special <frame> tags go inside the <frameset> tag and point to the documents that go inside the frames.

One problem with frames is that they only define a static display area in a browser window. Each frame in a window is essentially an independent, non-overlapping electronic document. In addition, frames are constrained by rigid formatting requirements. For example, the layout of a document within a frame cannot be changed once the document is created. Therefore, changes to the layout and/or the content of frames requires rewriting the source code for the respective frame.

One attempt to overcome the formatting limitations of HTML documents provides for nesting of other documents within a primary HTML document. Such a method is used to specify one or more nested documents which will be displayed within a primary document by inserting a special reference tag into the primary document. The primary reference tag is also used to specify the display layout of the nested documents, and the display techniques used for presenting the nested documents within the primary document.

While nesting of documents provides additional flexibility over frames, other disadvantages remain. For example, the nested documents exclusively occupy portions of the primary document, thereby rendering those portions of the primary document unviewable and inaccessible to users.

Another attempt to provide additional programming flexibility is the <layer> tag made available by Netscape 4.0. Layers allow for the positioning of content within the browser window. Layers let a programmer define a self-contained unit of HTML content that can be positioned anywhere in the browser window. The content of the layer can be defined between the layer tags or, alternatively, can be retrieved from another HTML document using the src attribute. However, documents retrieved using the src attribute are not true HTML documents and in particular, do not contain <body> or <head> tags. In addition, as with other prior art formatting features, layers render the underlying content of an HTML document inactive.

Therefore, there is a need for additional formatting flexibility for use with electronic documents such as HTML documents.

SUMMARY OF THE INVENTION

One aspect of the invention provides a method for formatting a displayable electronic document containing content from a first electronic document and a second electronic document. The method comprises retrieving the first electronic document containing displayable content and a pointer to the second electronic document containing displayable content; retrieving the second electronic document; and overlaying the displayable content of the second electronic document with the displayable content of the first electronic document to produce the displayable document. The displayable document contains viewable portions of the first electronic document and viewable portions of the second electronic document, wherein the viewable portions of the second electronic document contains active hyperlinks.

In another aspect of the invention, a method of formatting an electronic document adapted to be processed by a browser comprises providing displayable content in the electronic document; including in code of the electronic document a pointer to an underlying electronic document having displayable content including hyperlinks such that, when the electronic document is processed by the browser, the underlying electronic document is retrieved and overlaid with the displayable content of the electronic document to produce the electronic document and wherein the hyperlinks of the underlying document remain active.

In still another aspect of the invention, an electronic document adapted to be processed by a browser comprises a first portion of displayable content and a pointer to an underlying electronic document having a second portion of displayable content including hypertext links. When the pointer is processed by the browser, the underlying electronic document is retrieved and overlaid with the first portion of displayable content to produce the electronic document at least a portion of which includes the hyperlinks provided by the underlying electronic document, wherein the hyperlinks remain active after being overlaid.

In yet another aspect of the invention, a signal bearing medium containing a program which, when executed by one or more processors, causes the processors to perform steps comprising parsing an overlying electronic document including displayable content and a pointer to an underlying electronic document including displayable content at least a portion of which includes hyperlinks; retrieving the underlying electronic document; and formatting a displayable electronic document such that the displayable content of the overlying electronic document and the displayable content of the underlying electronic document overlap and the hyperlinks remain active.

In yet another aspect of the invention, a signal bearing medium containing a browser program which, when executed by one or more processors, causes the processors to perform steps comprising providing displayable content in an electronic document and including in code of the electronic document a pointer to an underlying electronic document having displayable content including hyperlinks such that, when the electronic document is processed by the browser program, the underlying electronic document is retrieved and overlaid with the displayable content of the electronic document to produce the electronic document and wherein the hyperlinks remain active.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention provides a method and article of manufacture for formatting electronic documents. In general, an electronic document contains an <activebackground> tag which, when parsed by a browser allows a first electronic document to format, or overlay, a second electronic document with additional or replacement content. Although overlaid by the first electronic document, portions of the second electronic document remain visible and accessible to the user unless explicitly overridden by the first electronic document. In particular, hyperlinks provided by the second electronic document can remain active.

Figure 1:
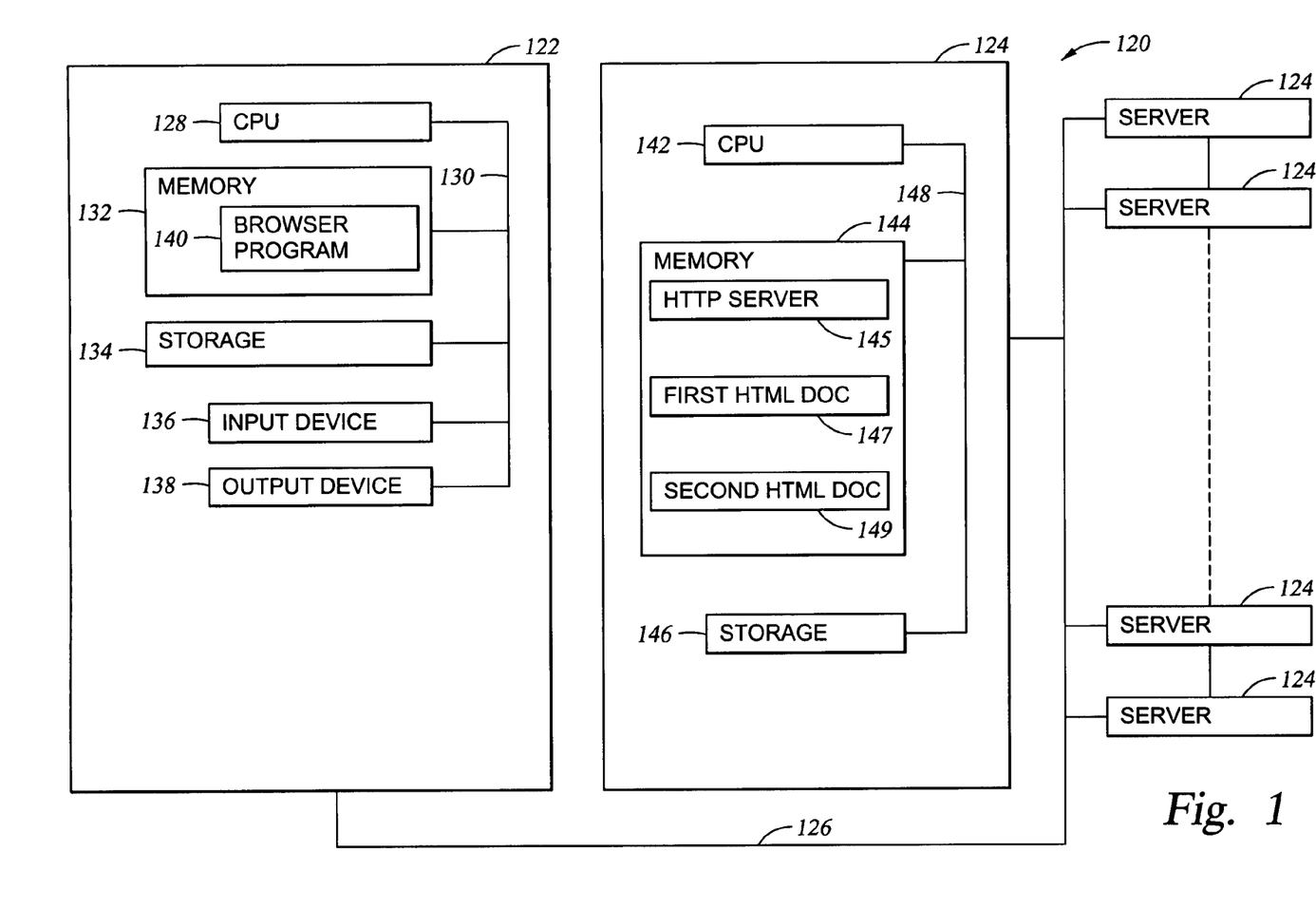
FIG. 1 is a block diagram showing a client computer containing a browser program and a connected server computer containing electronic documents.

FIG. 1 depicts a data processing system 120 in which the preferred embodiment may be implemented. In general, the data processing system 120 includes a client computer 122 and at least one server computer 124 (five such servers 124 are shown). The client computer 122 and the server computer 124 may be components of the same computer system or may be separate components connected via a network connection 126. In one embodiment, the server computer 124 comprise the Internet. The client computer 122 includes a Central Processing Unit (CPU) 128 connected via a bus 130 to memory 132, storage 134, input device 136 and output device 138. The input device 136 can be any device to give input to the client computer 122. For example, a keyboard, keypad, light pen, touch screen, button, mouse, track ball, or speech recognition unit could be used. The output device 138 is preferably any conventional display screen and, although showing separately from the input device 136, the output device 138 and input device 136 could be combined. For example, a display screen with an integrated touch screen, and a display with an integrated keyboard, or a speech recognition unit combined with a text speech converter could be used.

Memory 132 is preferably a random access memory sufficiently large to hold the necessary programming and data structures of the invention. While memory 132 is shown as a single entity, it should be understood that memory 132 may in fact comprise a plurality of modules, and that the memory 132 may exist at multiple levels, from high speed registers and caches to lower speed but larger DRAM chips. The memory 132 contains a browser program 140 that, when executed on the CPU 128, provides support for navigating between the various servers 124 and locating addresses at one or more of the servers 124. The contents of memory 132 can be loaded from and stored to the storage 134 as CPU 128 has a need for it.

The contents of memory 132 include a browser program 140 (also referred to as the "browser 140"). The browser 140 can be integrated with the operating system of the client computer 122, or can be a separate application. The browser program 140 may be initiated by a user on the client computer 122 and used to navigate between the servers 124. The documents accessible by the browser program 140 may reside on the client computer 122 or on the network of servers 124. For illustration, the invention is described in the context of the distributed system (such as the one shown in FIG. 1) wherein the browser 140 retrieves and renders remotely located electronic documents. After parsing the retrieved documents, the browser 140 may render the documents in a viewable format to a user using the output device 138.

In the preferred embodiment, storage 134 is DASD (Direct Access Storage Device), although it could be other storage such as floppy disc drives or optical storage. Although storage 134 is shown as a single unit, it could be any combination of fixed and/or removable storage devices, such as fixed disc drives, floppy disc drives, tape drives, removable memory cards, or optical storage. Memory 132 and storage 134 could be part of one virtual address space spanning multiple primary and secondary storage devices.

Each server computer 124 generally comprises a CPU 142, memory 144, and storage 146 coupled to one another by a bus 148. The storage 146 is provided for long-term storage of implementation code and data needed during operation. The memory 144 is random access memory sufficiently large to hold the necessary programming and data structures that are located on the server computer 124 according to a network information address, e.g., a URL. As shown, the memory 144 includes an HTTP server process 145 adapted to service requests from the client computer 122 regarding HTML documents. A first HTML document 147 and a second HTML document 149 are shown residing in the memory 144. Although shown residing on the same server 124, the first and second HTML documents may be located on separate servers 124. The programming and data structures may be accessed and executed by the CPU 142 as needed.

Although shown as HTML documents, the first and second HTML documents 147, 149 may be any electronic documents containing source code that can be rendered by the browser 140. Illustrative source code for the documents 147, 149 is shown below in Table 1 and Table 2, respectively.

TABLE 1

(overlay page)

```
<HTML>
<HEAD>
    <TITLE>My Mars</TITLE>
</HEAD>
<BODY ACTIVEBACKGROUNHD="http://www.mars.com" INHERIT=
NO TEXT=RED>
<H1>
 </H1>
<P> 
<BR> 
<BR> 
<P><B> (See How smart people can use logic and be wrong!)
<B/>
</BODY>
</HTML>
```

TABLE 2

(underlying page)

```
<HTML>
<HEAD?
    <TITLE>mars</TITLE>
</HEAD>
<BODY>
<H1>
Mars</H1>
<P>Flaugergues notices that the polar ice cap melts
significantly
<BR>in the Martian spring. He concludes that this implies
that
<BR>Mars is hotter than Earth.
</BODY>
</HTML>
```

Figure 3:
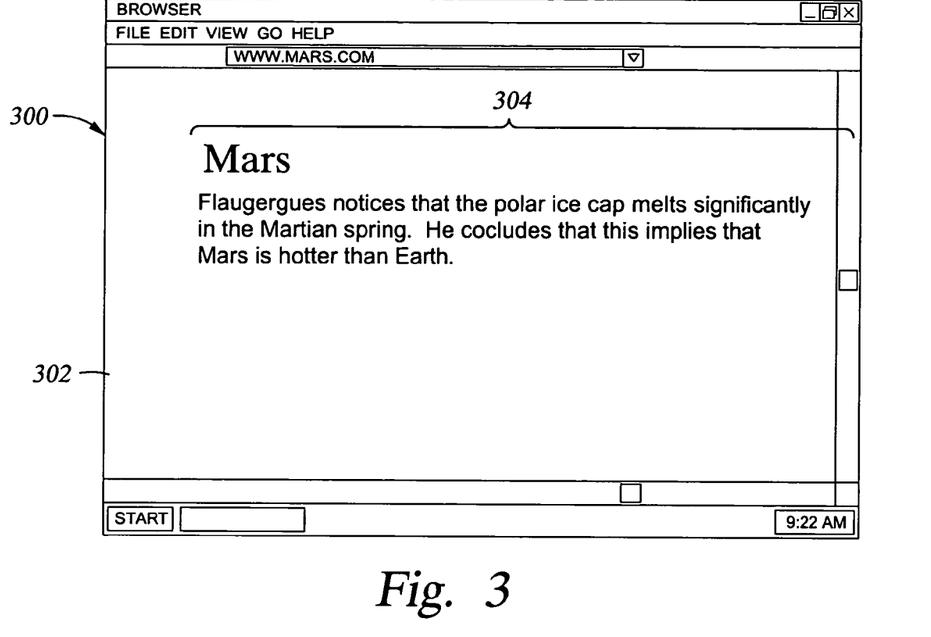
FIG. 3 is a Graphical User Interface for a browser displaying a conventional Web page.

Table 1 includes an <activebackground> tag. The <activebackground> tag is contained within the body of the first HTML document 147 and is set to a value having a URL of www.mars.com. Table 2 shows conventional HTML source code containing tags and attributes known in the art. The URL for table 2 is www.mars.com, the URL pointed to by the <activebackground> tag. FIG. 3 illustrates the format of the second HTML document 149 after being rendered by the browser 140. Rendering of the first HTML document 147 will be shown and described below.

The document pointed to by the <activebackground> tag is herein referred to as the "underlying page" while the page containing the <activebackground> tag is herein referred to as the "overlay page." Thus, for example, where the first HTML document 147 is defined by the source code contained in Table 1, the first HTML document 147 is the overlay page because the source code contains the <activebackground> tag. The URL pointed to by the <activebackground> tag (i.e., the underlying page) may be any document residing on the network of servers 124 or the client computer 122. Illustratively, the URL pointed to is www.mars.com which is the network address for the second HTML document 149.

In some embodiments, the source code of the overlying page may include code to control, override or otherwise modify the attributes of the underlying page. Such formatting attributes include background color, text color, fonts and alike. Illustratively, the source code shown in Table 1 includes an "inherit" flag. As will be described below, attributes of the underlying page can either be carried into the resulting page rendered by the browser 140 or can be changed.

Although a specific hardware configuration is shown for data processing system 120, a preferred embodiment of the present invention can apply to any hardware configuration that allows the browsing of documents, regardless of whether the computer system is a complicated, multi-user computing apparatus, a single-user workstation, or a network appliance that does not have non-volatile storage of its own.

Figure 2:
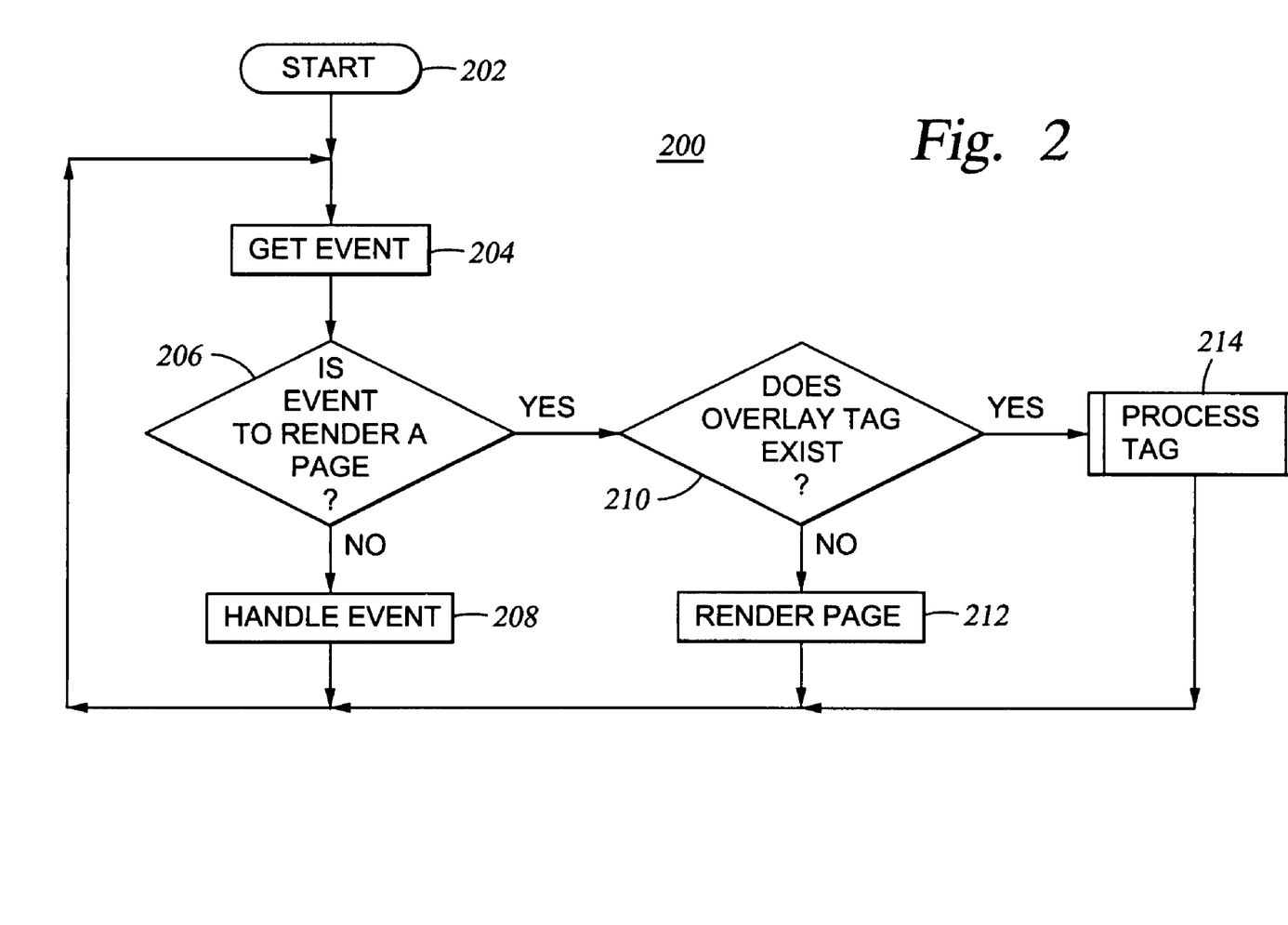
FIG. 2 is a flowchart illustrating the operation of the browser.

FIG. 2 is a flow chart of a process 200 that occurs as a user operates the browser 140 on the client computer 122. The description of FIG. 2 will be made with occasional reference to FIG. 1 where appropriate. Entry into process 200 is depicted in block 202. During operation, the user initiates various actions which are executed by the browser 140 as represented by block 204. Illustrative events include bookmarking a page, formatting a browser window size, moving backwards or forwards between pages, rendering an electronic document, etc. At step 206, the browser 140 queries whether the event is to render a page. A render-page event may be initiated by a user attempting to access a web page such as one of either the first HTML document 147 or the second HTML document 149. For example, the user may click on a hypertext link or manually enter a URL into the address window of the browser 140. If the event is not to render a page, the method 200 proceeds to step 208 where the event is handled appropriately as is known in the art. The method 200 then returns to step 204 to receive the next event.

If the event processed at step 206 is to render a page, the method 200 proceeds to step 210 where the browser 140 queries whether an <activebackground> tag exists in the retrieved page being parsed. Table 1 shown above includes illustrative source code for the first HTML document 147 and includes an <activebackground> tag. Accordingly, step 210 comprises parsing the retrieved electronic document to determine the existence of an <activebackground> tag in the source code of the document. If the electronic document does not contain an <activebackground> tag, the document is rendered (at step 212) as is known in the art. If the electronic document does contain an <activebackground> tag, the method 200 proceeds to step 214 where the tag is processed. In either case, the method 200 then returns to step 204 where the browser 140 retrieves the next event.

Figure 4A:
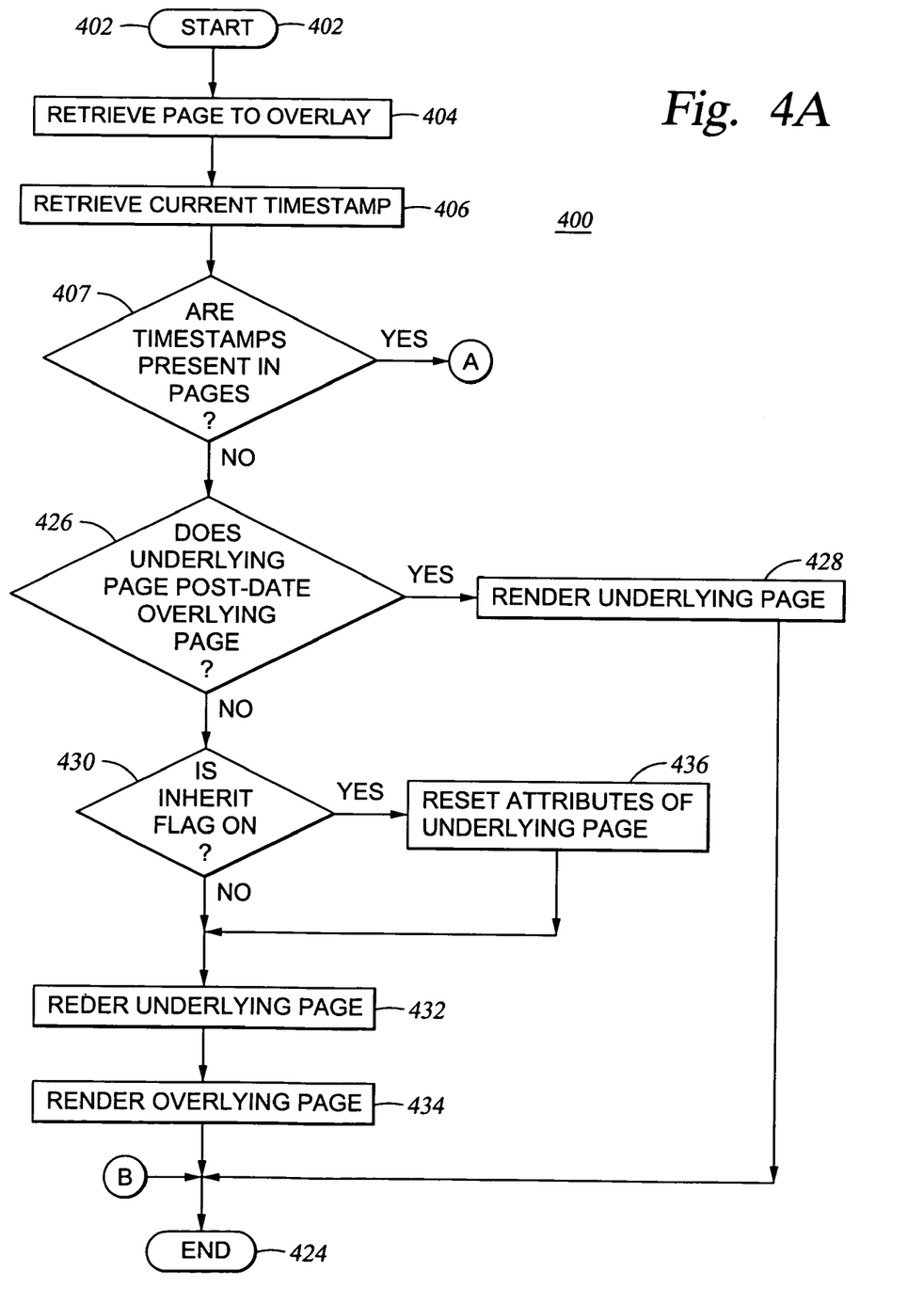
FIG. 4 is a flowchart of a method for formatting an electronic document using the browser.
Figure 4B:
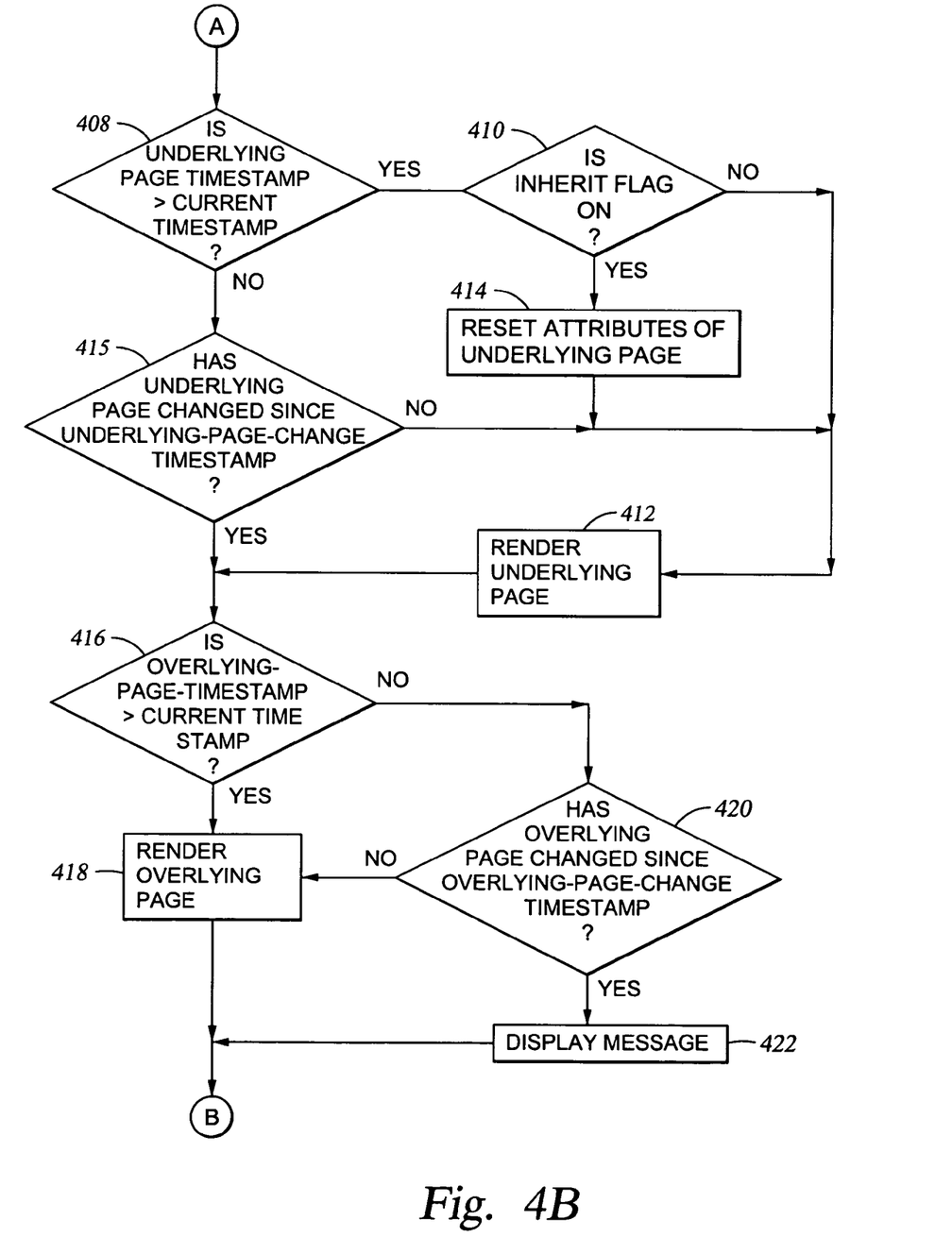

One embodiment of a method 400 for processing the <activebackground> tag and proceeds to step 404 where the page to overlay (i.e., the document pointed to by the <activebackground> tag) is retrieved. In this case, the document pointed to is the second HTML document 149.

Upon retrieving the underlying page (the second HTML document 149) at step 404, the method 400 takes steps to render and display a page to the user. In some embodiments, it may be desirable to first determine the validity of the overlying page and/or the underlying page prior to rendering a page for display to the user. Accordingly, the method 400 utilizes timestamps to make a determination of validity. Illustratively, the timestamps utilized in method 400 include a current timestamp, an underlying page timestamp, an underlying page change timestamp, an overlying page timestamp and an overlying page change timestamp. The current time stamp merely indicates the current time and may also be provided by the server being accessed or, alternatively, may be provided by the client computer 122 on which the browser resides. In one embodiment, the underlying page timestamp, underlying page change timestamp, overlying page timestamp and overlying page change timestamp are contained in the source code of the overlying page. For example, the <activebackground> tag of the overlying page may be formatted as follows: <activebackground href=www.mymars.com, overlying-page-timestamp= (timestamp value 1), overlying-page-change-timestamp= (timestamp value 2), underlying-page-timestamp=(timestamp value 3), underlying-page-change-timestamp= (timestamp value 4)>. Timestamp values 1–4 are values indicating, for example, a month, day and time for each of the respective timestamp definitions.

The timestamps are each selected to determine whether to render the underlying page and the overlying page. The underlying page timestamp may have applicability, for example, where the underlying page contains information about a limited time promotion. The value of the underlying page timestamp may be set equal to the last day of the promotion. The underlying page change timestamp is utilized in a comparison with the time of the last modification to the underlying page. The overlying page timestamp and the overlying page change timestamp enable similar functionality for the overlying page.

At step 406, the browser 140 retrieves the current timestamp indicating the current time. At step 407, the method 400 queries whether timestamps are present in the overlying page. Specifically, step 407 comprises scanning the HTML source code of the page to determine whether the timestamps are embedded therein. If timestamps are present, the method 400 proceeds to step 408. If timestamps are not present, the method 400 proceeds to steps 426. Step 408 and steps flowing therefrom are described first.

At step 408, the method 400 queries whether the "underlying page timestamp" is greater than the current timestamp. If the underlying page timestamp is greater than the current timestamp, the method 400 proceeds to step 410 where the method 400 queries whether the inherit flag is on. Illustratively, the source code shown in Table 1 indicates that the value for the inherit flag is set to "NO." Accordingly, the method 400 proceeds to step 412 where the underlying page is rendered by the browser 140. If, on the other hand, the inherit flag is set to "YES" than the method 400 proceeds to step 414 where the attributes for the underlying page are reset, i.e. modified according to the attributes defined in the overlying page. The underlying page is rendered with the modified attributes at step 412. For example, the Table 1 indicates that the value for the TEXT attribute contained within the <activebackground> tag is set to RED, thereby defining the color of the text provided in the source code of the first HTML document 147 to be red. If the value for the inherit flag is set to "YES" then the color defined by the TEXT attribute is also applied to the text of the underlying page. Other attributes of the underlying page may be similarly controlled. The invention also contemplates handling the situation where the attributes of the underlying page are explicitly defined by source code differently from the situation where the attributes are rendered by the browser according to default values. Accordingly, the inherit flag may provide for a "strong inherit" and a "weak inherit." A strong inherit is adapted to override any defined formatting code (e.g., attributes) contained in the underlying page. The weak inherit is adapted to override any default values provided by the browser, but explicitly defined formatting code is not overridden. The method 400 proceeds from step 412 to step 416.

If, on the other hand, the underlying page timestamp is less than the current timestamp, the method 400 proceeds to step 415 and queries whether the underlying page has changed since the value of the "underlying page change timestamp." The underlying page change timestamp may be provided by a conventional datetime attribute contained in the source code of the underlying page and having a value indicating the most recent modifications made to the underlying page. If the determination made at step 415 indicates that the underlying page has not changed, the method 400 proceeds to step 412 and continues processing as described above. The method 400 then proceeds to step 416.

At step 416, the overlying page timestamp is compared to the current timestamp to determine which value is greater. If the overlying page timestamp is greater, the overlying page is rendered at step 418. Otherwise, the method 400 proceeds to step 420 and queries whether the overlying page has changed since the overlying page change timestamp. If not, the overlying page is rendered at step 418.

If neither the underlying page nor the overlying page are rendered by the method 400, then at step 422 a message is displayed to the user of the client computer 122 indicating that the pages being requested are invalid or otherwise inaccessible to the browser 140. The method 400 is exited at step 424. Returning now to step 407, in the event no timestamps are embedded in the overlying page the method 400 proceeds to step 426. At step 426, the method 400 queries whether the underlying page postdates the overlying page. This determination may be made using network date-information conventionally provided to a client requesting access to a page residing on a server. If the underlying page postdates the overlying page, the browser 140 renders the underlying page at step 428. The method 400 then exits at step 424. If the underlying page does not postdate the overlying page, the method 400 proceeds to step 430 and queries whether the inherit flag is on, as was described with reference to step 410. If not, the browser 140 renders the underlying page and the overlying page at steps 432 and 434, respectively. The method 400 then exits at step 424. If the inherit flag is on, the method 400 proceeds to step 436 where the attributes of the underlying page are reset as was described with reference to step 414. The method 400 then renders the underlying page (step 432) and the overlying page (step 434) and then exits at step 424.

Figure 5:
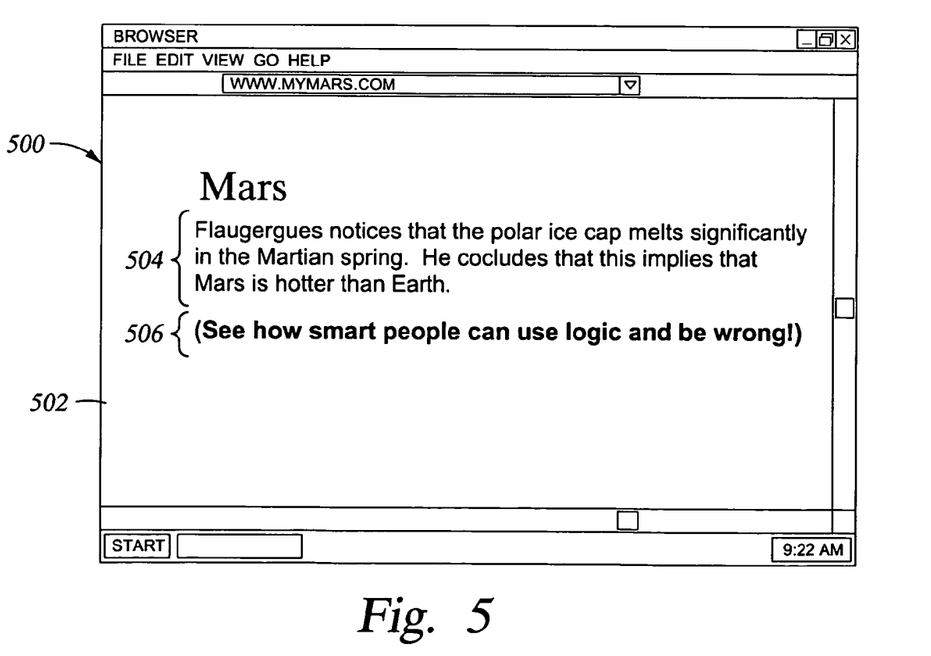
FIG. 5 is a Graphical User Interface for a browser displaying a Web page formatted according to the invention.

In the event that both the underlying page and the overlay page are rendered, the browser window displays a hybrid page containing attributes of the underlying page as modified by the overlay page. FIG. 5 shows a browser window 500 illustrating the resulting layout of such a hybrid page 502. The page 502 contains the text 504 provided in the source code of the underlying page (shown in Table 2) and the text 506 provided in the source code of the overlay page (shown in Table 1). Because the underlying document is in fact a separate HTML document called by the overlying document, the contents of the underlying document are not flowed "inline" into the contents of the overlying document. Instead, the relative positioning of the contents of the underlying document in the overlying document may be determined by formatting attributes contained in the source code of the overlying document. Accordingly, the source code for the first HTML document 147 (the overlying page) shown in Table 1 includes formatting tags and attributes such as header tags <Hi> and spacing attributes " ." Other methods of formatting the resulting page are contemplated.

In any event, the dimensions of the overlying page are preferably selected to be commensurate with the underlying page. Accordingly, the entire underlying page may be overlaid by the overlying page. Nevertheless, the contents of the underlying page may continue to be viewable and accessible to a user. For example, in the resulting web page 502 shown in FIG. 5, the content 504 of the underlying page and the content 506 of the overlying page may include both static portions such as text and active portions such as hyperlinks. The hyperlinks contained in the underlying page remain active unless expressly overwritten by formatting features contained in the overlying page. These attributes can be described with reference to FIGS. 6–8.

Figure 6:
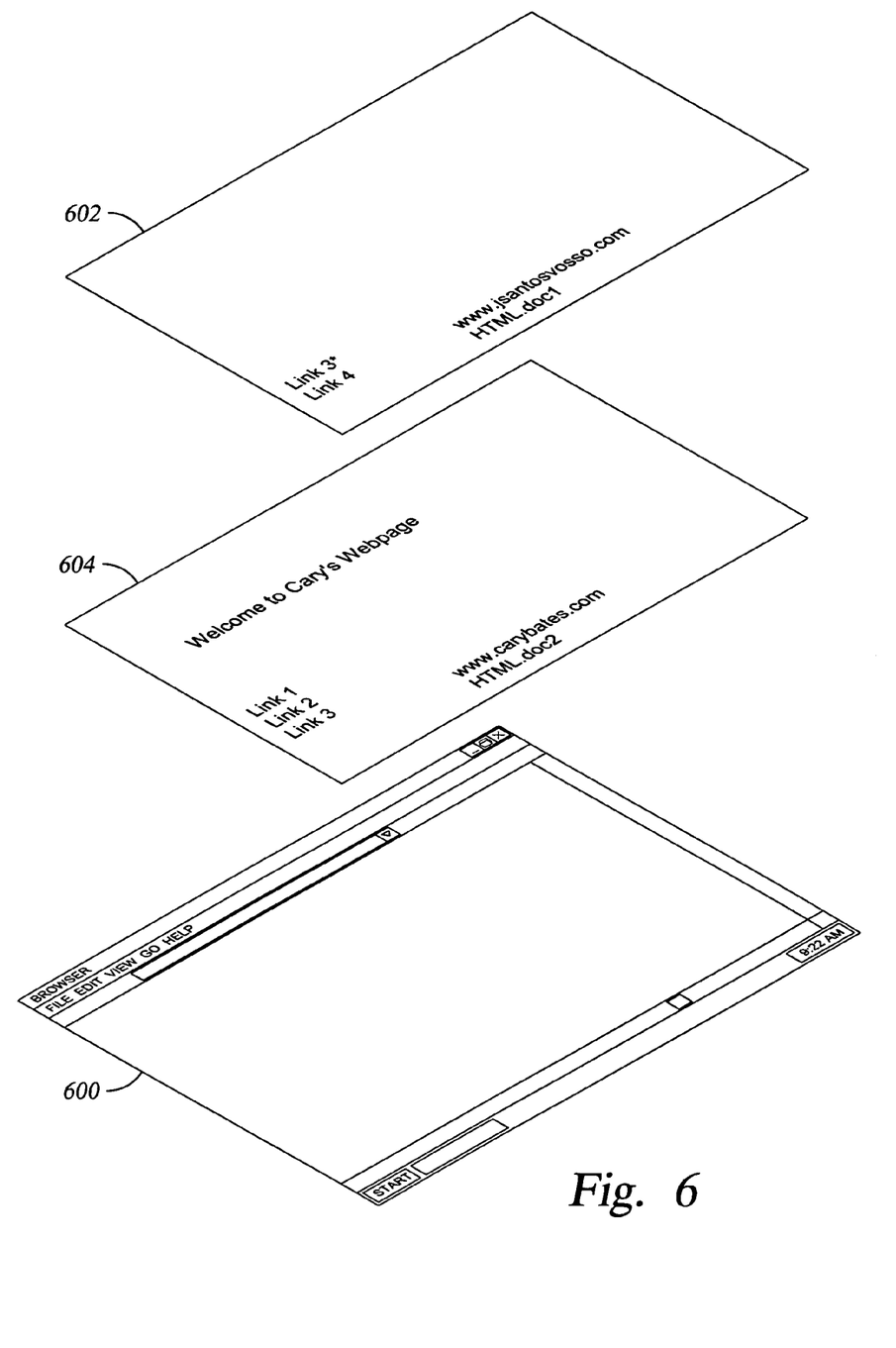
FIG. 6 is a perspective view of HTML pages and a browser GUI.

FIG. 6 shows a perspective view of a browser window 600 and illustrating the relative positioning of an overlying page 602 (having the URL www.JSantosuosso.com) and underlying page 604 (having the URL www.Cary-Bates.com). The underlying page 604 contains a static textual heading ("Welcome to Cary's Web Page") and a plurality of hypertext links (Link 1, Link 2, Link 3). The overlying page 602 contains a first hypertext link (Link 3*) and a second hypertext Link (Link 4). Link 3* is positioned to superimpose Link 3 of the underlying page 604, thereby overriding Link 3 on the underlying page 604.

Figure 7:
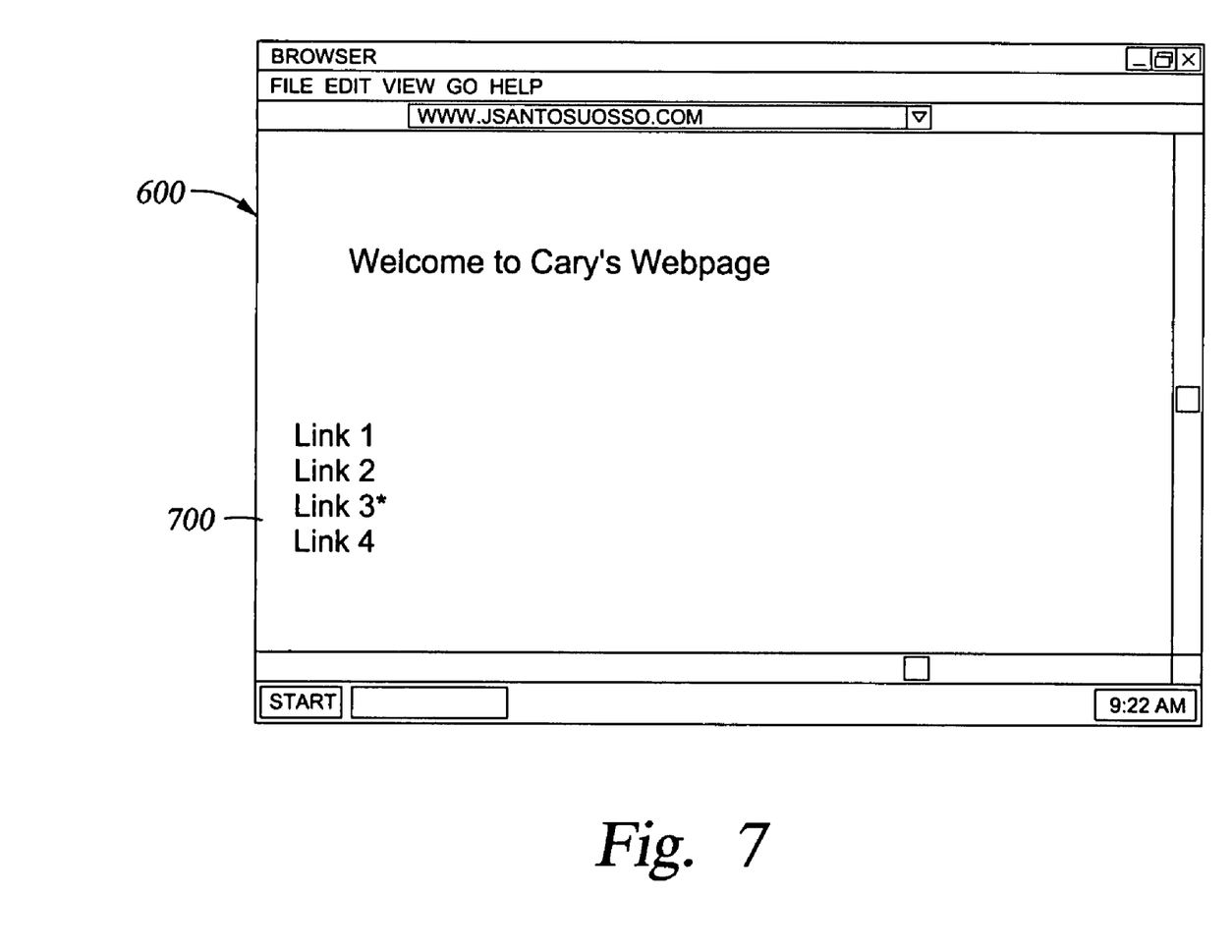
FIG. 7 is a Graphical User Interface for a browser displaying a Web page formatted according to the invention.
Figure 8:
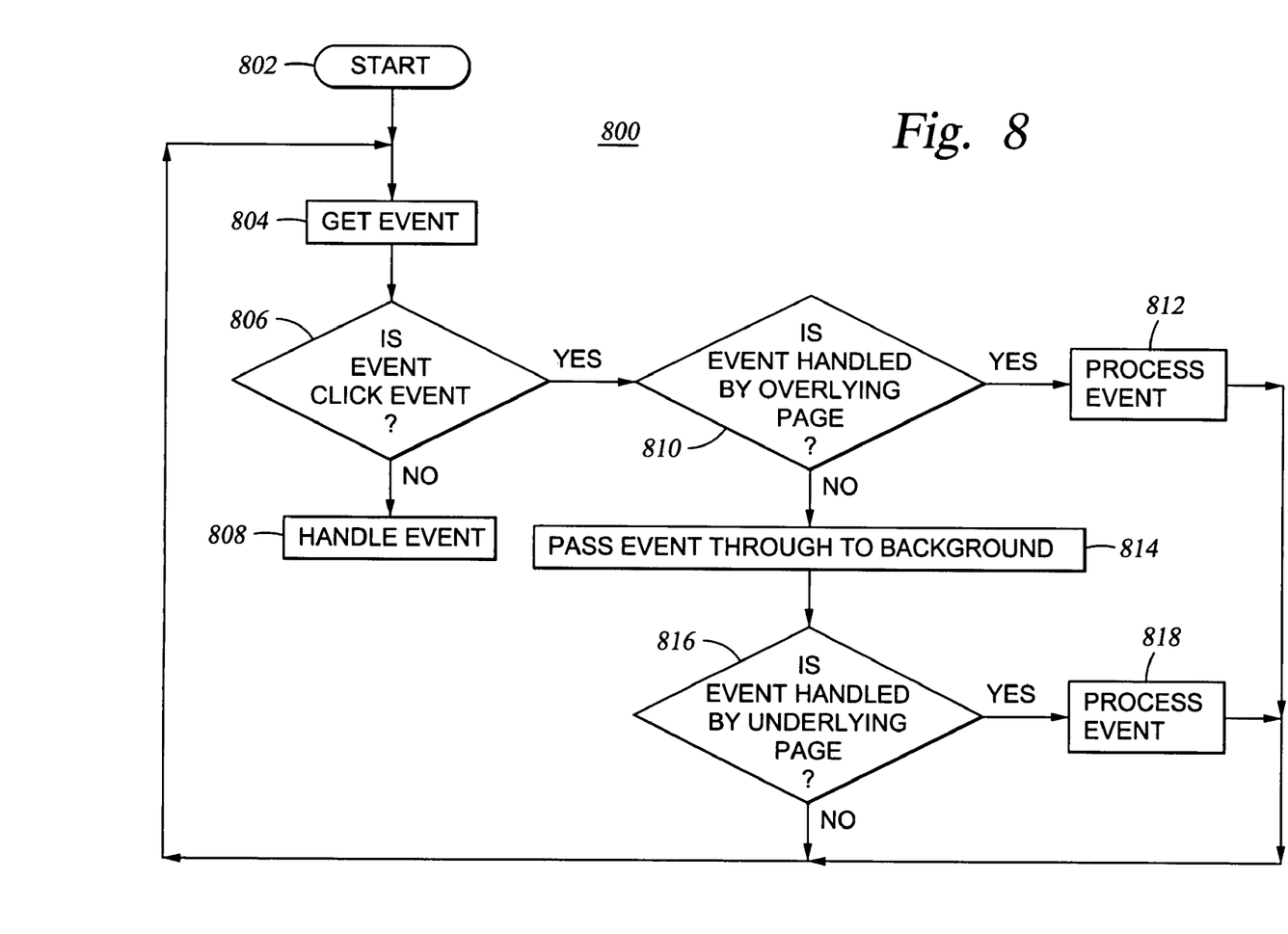
FIG. 8 is a flowchart for a method of operating the browser.

FIG. 7 shows the browser window 600 and illustrates the resulting "hybrid" Web page 700 rendered by a browser (such as browser 140) after processing the source code of the overlying page 602 in a manner described with reference to FIG. 2 and FIG. 4. The textual heading ("Welcome to Cary's Web Page") and the first two hypertext links (Link 1 and Link 2) are provided by the source code of the underlying page 604. Link 3 of the underlying page 604 is overwritten by the Link 3* of the overlying page 602. Accordingly, a user clicking on Link 3* will cause the browser to retrieve the page located at the URL associated with Link 3* of the overlying page 602 rather than the URL associated with Link 3 of the underlying page 604. A method 800 of interacting with a page rendered as a result of processing the source code of an overlying page is shown in FIG. 8.

The method 800 is entered at step 802 and then proceeds to step 804 to get an event. At step 806, the method queries whether the event is a click event. A click event refers to any event in which the user attempts to interact with a hyperlink displayed on the browser window 600. The interaction may be as a result of clicking on a hyperlink with a mouse pointer, highlighting a hyperlink and pressing the enter button on keyboard, and the like. If the event is not a click event, the method 800 proceeds to step 808 where the event is handled appropriately. If the event is a click event, the method 800 queries whether the event is handled by the overlying page 602. An event is handled by the overlying page 602 when the portion of the page being interacted with is a portion expressly provided by the overlying page 602 (i.e., all portions other than those called into the page by the <activebackground> tag). In the case of the Web page 700, such portions include the overriding Link 3* and the added Link 4. If the event is handled by the overlying page 602, then the event is processed accordingly at step 812. If the event is not handled by the overlying page 602, then the event is passed through to the background at step 816 where the method 800 queries whether the event is handled by the underlying page 604. Illustrative events handled by the underlying page 604 include interactions with the hypertext Link 1 and Link 2. If step 816 is answered affirmatively, the event is processed at step 818. In either case, the method 800 returns to step 804 to get the next event. The formatting methods of the invention are not limited to overriding hyperlinks in electronic documents. Rather, any attribute of an underlying page may be reformatted. For example, the source code of an underlying page may specify the background color to be red and a programmer may desire the background color to be blue. As described above, the programmer may use the inherit flag in the <activebackground> tag to control the formatting of the resulting page. The invention contemplates any method and control code understood by the enhanced browser of the invention to override those attributes defined in the source code of the underlying page.

The present invention affords numerous advantages over the prior art in addition to those described above. For example, it is often desirable to format a Web page according to the path taken to reach the web page. Illustratively, a web site may contain three sections: a business section, a finance section, and a sports section each containing a hyperlink defined as "Mars" and pointing to the URL www.mars.com. Depending on which section (business, finance or sports) the user accesses the Mars page from, the page is formatted differntly. This formatting approach allows programmers to "customize" a web page according to the preferences of a user as defined by the browsing history of the user. Conventionally, such customization is done using JavaScript. However, utilization of JavaScript requires programmers to manually write the appropriate JavaScript code, a time-consuming process. The present invention facilitates user preferences customization. In one embodiment, the Mars hyperlinks on each of the business, finance or sports sections points to a unique page each containing an <activebackground> tag which, in turn points to the URL for the Mars page (www.mars.com). Because each Mars hyperlink points to a separate HTML entity, each page rendered by the browser may contain unique formatting even though each page calls material from the page located at www.mars.com. Accordingly, an underlying HTML page may be formatted differently depending on the location from which the underlying page was accessed.

While the foregoing is directed to the preferred embodiment of the present invention, other and further embodiments of the invention may be devised without departing from the basic scope thereof, and the scope thereof is determined by the claims that follow.

What is claimed is:

1. A method, comprising:
    retrieving a first electronic document containing displayable content and a pointer to a second electronic document containing displayable content;
    retrieving the second electronic document; and
    overlaying the displayable content of the second electronic document with the displayable content of the first electronic document to produce a displayable document containing viewable portions of the displayable content of the first electronic document and viewable portions of the displayable content of the second electronic document, wherein the viewable portions of the second electronic document contains active hyperlinks.

2. The method of claim 1, wherein the first and the second electronic documents are HTML documents.

3. The method of claim 1, wherein retrieving at least one of the first and second electronic documents comprises issuing a request to a server.

4. The method of claim 1, further comprising outputting the displayable document to a display wherein at least a portion of the displayable content of the first electronic document and the second electronic document are viewable.

5. The method of claim 1, further comprising:
    prior to overlaying the displayable content of the second electronic document with the displayable content of the first electronic document, determining whether the second electronic document has been modified subsequent to a recorded time.

6. The method of claim 1, wherein at least the second electronic document contains <body> tags.

7. The method of claim 1, wherein the pointer is a HTML tag recognizable to the browser.

8. A method of formatting an electronic document adapted to be processed by a browser, comprising:
    providing displayable content in the electronic document; and
    including in code of the electronic document a pointer to an underlying electronic document having displayable content including hyperlinks such that, when the electronic document is processed by the browser, the underlying electronic document is retrieved and the displayable content of the underlying electronic document is overlaid with the displayable content of the electronic document to produce the electronic document and wherein the hyperlinks remain active.

9. The method of claim 8, wherein the underlying electronic document is an HTML document.

10. The method of claim 8, wherein at least one of the electronic document and the underlying electronic document includes a timestamp for use in determining whether a modification has been made to the electronic document.

11. The method of claim 8, including with the electronic document and the underlying electronic document formatting attributes selected to allow portions of the displayable content of the electronic document and the underlying electronic document to be viewed on a display device.

12. The method of claim 8, wherein the pointer is a HTML tag recognizable to the browser.

13. The method of claim 8, wherein the displayable electronic document includes viewable portions of the overlying electronic document and the underlying electronic document.

14. A server computer, comprising:
    a memory containing a server program and an electronic document adapted to be processed by a browser, the electronic document comprising:
        a first portion of displayable content; and
        a pointer to an underlying electronic document having a second portion of displayable content including hypertext links such that, when the pointer is processed by the browser, the underlying electronic document is retrieved and overlaid with the first portion of displayable content to produce the electronic document at least a portion of which includes the hyperlinks provided by the underlying electronic document, wherein the hyperlinks remain active after being overlaid; and
    a processor configured to execute the server program which then operates to provide the electronic document to a client computer running the browser.

15. The server computer of claim 14, further comprising a timestamp associated with the underlying electronic document for use in determining whether a modification has been made to the underlying electronic document since the time indicated by the timestamp.

16. The server computer of claim 14, wherein the pointer is a HTML tag recognizable to the browser.

17. The server computer of claim 14, wherein the electronic document includes viewable portions of the first portion of displayable content and viewable portions of the second portion of displayable content.

18. The server computer of claim 14, wherein the first portion of displayable content contains transparent portions and opaque portions.

19. A signal bearing medium containing a program which, when executed by one or more processors, causes the processors to perform steps comprising:
    parsing an overlying electronic document including displayable content and a pointer to an underlying electronic document including displayable content at least a portion of which includes hyperlinks;
    retrieving the underlying electronic document; and
    formatting a displayable electronic document such that the displayable content of the overlying electronic document and the displayable content of the underlying electronic document overlap and the hyperlinks remain active.

20. The signal bearing medium of claim 19, wherein formatting a displayable electronic document comprises rendering the overlying electronic document with a browser.

21. The signal bearing medium of claim 19, further comprising outputting the displayable electronic document on a display.

22. The signal bearing medium of claim 21, wherein the program is a browser.

23. The signal bearing medium of claim 21, wherein the pointer is an HTML tag.

24. A signal bearing medium containing a browser program which, when executed by one or more processors, causes the processors to perform steps comprising:
   providing displayable content in an electronic document; and
   including in code of the electronic document a pointer to an underlying electronic document having displayable content including hyperlinks such that, when the electronic document is processed by the browser program, the underlying electronic document is retrieved and the displayable content of the underlying electronic document is overlaid with the displayable content of the electronic document to produce the electronic document and wherein the hyperlinks remain active.

25. The signal bearing medium of claim 24, wherein the underlying electronic document is an HTML document.

26. The signal bearing medium of claim 24, further comprising outputting the electronic document on a display.

27. The signal bearing medium of claim 24, wherein the pointer is an HTML tag.

28. The signal bearing medium of claim 24, further comprising including with the electronic document and the underlying electronic document formatting attributes selected to allow portions of the displayable content of the electronic document and the underlying electronic document to be viewed on a display device.

29. The signal bearing medium of claim 24, wherein the displayable electronic document includes viewable portions of the overlying electronic document and the underlying electronic document.

* * * * *